No. 657,484. Patented Sept. 4, 1900.
L. DION.
CLOSED CONDUIT ELECTRIC RAILWAY.
(Application filed Mar. 6, 1899.)

(No Model.)

WITNESSES—
Harry M. Rugg
Edward H. Temple

INVENTOR—
Léon Dion

UNITED STATES PATENT OFFICE.

LÉON DION, OF BOSTON, MASSACHUSETTS.

CLOSED-CONDUIT ELECTRIC RAILWAY.

SPECIFICATION forming part of Letters Patent No. 657,484, dated September 4, 1900.

Application filed March 6, 1899. Serial No. 707,857. (No model.)

*To all whom it may concern:*

Be it known that I, LÉON DION, of Boston, in the county of Suffolk and State of Massachusetts, have invented certain new and useful Improvements in Closed-Conduit Electric Railways, of which the following is a specification.

This invention relates to closed-conduit electric-railway systems, in which a magnet carried by the car is used as a means for energizing the surface conductor.

The invention has for its object to provide improvements with relation to the magnet and the electric collector.

It consists in the improvements which I shall now proceed to describe and claim.

Figure 1:
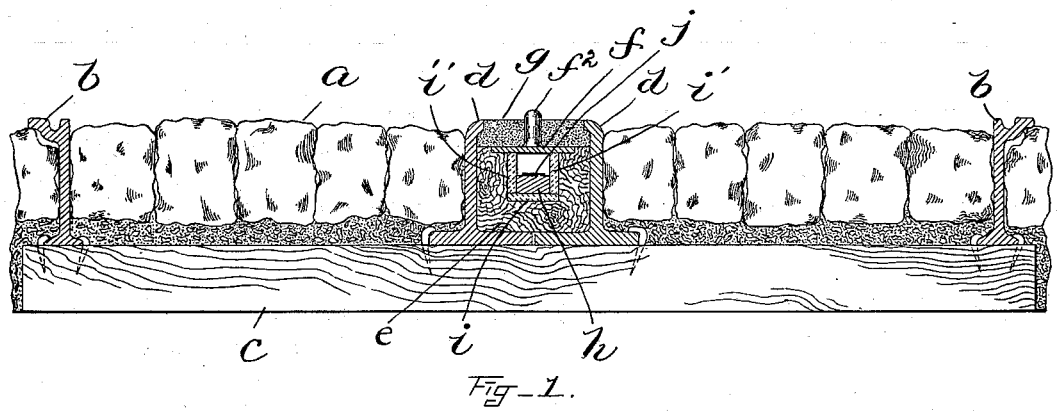
Figure 2:
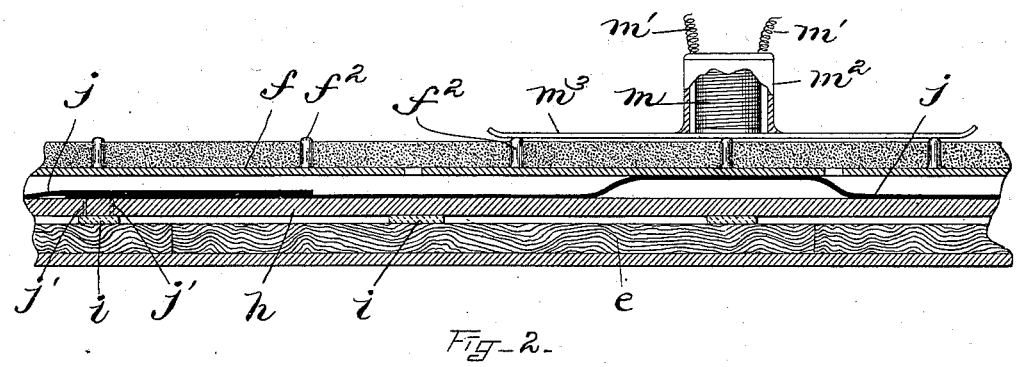

Of the accompanying drawings, Figure 1 represents a cross-section of an electric railway. Fig. 2 represents a median longitudinal section of the same, showing the car-magnet and collecting-shoe in side elevation and section.

The same reference characters indicate the same parts in both figures.

Referring to the drawings, $a$ designates a roadway which may be of any approved or convenient construction.

$b\ b$ designate the car-supporting rails, and $c$ designates cross-ties supporting the rails.

In the center of the roadway and supported on ties $c$ is a conduit constructed with an outer casing composed of L-shaped plates set together. Inside of the channel or trough thus formed is mounted a filling, which may be a beam $e$, of wood, channeled at the top and containing a main electrical conductor $h$, supported on horizontal insulating-pieces $i$ and flanked by vertical insulating-pieces $i'\ i'$. Lying on the upper surface of the conductor $h$ is an auxiliary conductor $j$, which is composed of a number of independent sections, as shown in Fig. 2. The ends of these sections may overlap, as shown, and one part of each section may be secured by rivets $j'\ j'$ to the main conductor $h$. The roof of the channel inclosing the conductors is formed by a number of elongated plates $ff$, insulated from each other and forming a sectional surface conductor. These plates are overlaid by a layer $g$ of suitable filling material—such as concrete, cement, asphalt, or the like—whereby the conduit is made thoroughly watertight. Studs $f^2\ f^2$, which may be cast integrally with the plates $ff$, project upwardly from said plates at intervals and extend slightly above the surface of the roadway. The plates $f$ and their studs $f^2$ may be composed of a suitable non-magnetic metal, such as manganese steel.

$m$ is a magnet carried by the car (the car not being shown in the drawings) and having its lower pole within a short distance of the surface of the roadway. $m'\ m'$ are the electrodes of the said magnet. The magnet $m$, in accordance with my present invention, is inclosed in a hollow casing $m^2$, which thoroughly protects the magnet and which may be composed of a metal such as bronze. At its lower end the casing $m^2$ supports an elongated horizontal collecting-shoe $m^3$, which is preferably of sufficient length to make contact simultaneously with two or more of the conductive studs $f^2$. The shoe $m^3$ may conveniently be cast integrally with the casing $m^2$, the whole forming a simple, strong, and effective magnet protector and shoe.

In operation the magnet $m$, being energized by the electric current, exerts a magnetic influence which lifts the auxiliary conductor $j$ into contact with the sectional surface conductor $f$, and thereby energizes the latter, so that the shoe $m^3$ can collect current from the studs $f^2$ and convey the same to the car-motor. The rails $b\ b$ may form the return-conductor, as usual. As the car passes along the road each section of the auxiliary conductor $j$ is elevated in turn, a loop being formed beneath the magnet $m$, as shown in Fig. 2. When the car passes onto the next section of the auxiliary conductor, the preceding section falls into its normal position on top of the main conductor $h$, and the sections of the surface conductor are thereby successively energized and deënergized.

A magnet mounted in the manner described may obviously be employed in connection with closed conduits of other forms than that illustrated in the drawings and hereinbefore described.

I do not herein claim a surface conductor buried beneath the surface of the roadway and having conductive portions or members projecting at intervals above the surface of the roadway, as the same forms the subject of another application, Serial No. 707,859, filed by me concurrently with this.

I claim—

In a closed-conduit electric-railway system, a surface conductor, a casing carried by the car and supporting at its lower end a collecting-shoe adapted to run in contact with said conductor, and a magnet inclosed in said casing.

In testimony whereof I have affixed my signature in presence of two witnesses.

LÉON DION.

Witnesses:
 R. M. PIERSON,
 C. F. BROWN.